United States Patent
Zhang et al.

(10) Patent No.: US 10,748,281 B2
(45) Date of Patent: Aug. 18, 2020

(54) NEGATIVE SAMPLE ENHANCED OBJECT DETECTION MACHINE

(71) Applicant: INTERNATIONAL BUSINESS MACHINES CORPORATION, Armonk, NY (US)

(72) Inventors: Xiaolu Zhang, Beijing (CN); Xin Zhang, Beijing (CN); Dingli Gao, Beijing (CN); Peng Gao, Beijing (CN); Xiu Li Li, Beijing (CN); Shiwan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 16/041,783

(22) Filed: Jul. 21, 2018

(65) Prior Publication Data
US 2020/0027207 A1    Jan. 23, 2020

(51) Int. Cl.
*G06T 7/00* (2017.01)
*G06K 9/62* (2006.01)

(52) U.S. Cl.
CPC .......... *G06T 7/0012* (2013.01); *G06K 9/6247* (2013.01); *G06K 9/6256* (2013.01); *G06K 2209/051* (2013.01)

(58) Field of Classification Search
CPC ............ G06K 2209/051; G06K 9/6256; G06T 7/0012
See application file for complete search history.

(56) References Cited

U.S. PATENT DOCUMENTS

| | | | |
|---|---|---|---|
| 2015/0379708 A1* | 12/2015 | Abramoff | G06T 7/0012 382/128 |
| 2016/0104058 A1* | 4/2016 | He | G06K 9/6255 382/156 |
| 2017/0099200 A1* | 4/2017 | Ellenbogen | H04L 43/04 |
| 2017/0287134 A1* | 10/2017 | Abedini | G06K 9/622 |
| 2018/0018524 A1* | 1/2018 | Yao | G06K 9/00362 |
| 2018/0096192 A1* | 4/2018 | Sigal | G06K 9/4628 |

(Continued)

OTHER PUBLICATIONS

Anonymous, Next: Target Builtins, Previous: Pointer Bounds Checker builtins, Up: C Extensions; https://gcc.gnu.org/onlinedocs/gcc-3.3/gcc/Other-Builtins.html (XXXX); 13 pgs.

(Continued)

*Primary Examiner* — Gandhi Thirugnanam
(74) *Attorney, Agent, or Firm* — Intelletek Law Group, PLLC; Gabriel Daniel, Esq.

(57) ABSTRACT

A method and system of detecting abnormalities captured in a medical image are provided. A medical image is received having one or more lesions and one or more interferences. One or more convolution layers are applied to the medical image to create one or more feature maps, respectively. A region proposal network (RPN) is applied to each of the one or more feature maps to create a bounding box around each lesion and interference. For each bounding box, an object in the bounding box is classified as a lesion, an interference, or a background. Each object that is incorrectly classified as a lesion but determined to be an interference, is stored as a hard-negative example to be part of a training set for a next application of the RPN.

20 Claims, 8 Drawing Sheets

(56) References Cited

U.S. PATENT DOCUMENTS

| | | | |
|---|---|---|---|
| 2019/0015059 A1* | 1/2019 | Itu | G06K 9/46 |
| 2019/0114481 A1* | 4/2019 | Dechant | G06N 3/08 |
| 2019/0139643 A1* | 5/2019 | Li | G06N 3/0454 |
| 2019/0318822 A1* | 10/2019 | Zhang | G06K 9/6257 |
| 2020/0027207 A1* | 1/2020 | Zhang | G06T 7/0012 |
| 2020/0034669 A1* | 1/2020 | Ordonez | G06K 9/6292 |

OTHER PUBLICATIONS

Anonymous, Next: Preprocessor Options, Previous: Optimize Options, Up: Invoking GCC; https://gcc.gnu.org/onlinedocs/gcc/Instrumentation-Options.html (XXXX); 14 pgs.

Anonymous, Branch predictor, WikipediA (2018); 13 pgs.

Christ, P.F. et al, "Automatic Liver and Tumor Segmentation of CT and MRI Volumes Using Cascaded Fully Convolutional Neural Networks", arXiv:1702.05970v2 [cs.CV] (Feb. 23, 2017); 21 pgs.

D'Anastasi, M. et al., "Automatic Liver and Tumor Segmentation of CT and MRI Volumes using Cascaded Fully Convolutional Neural . . . ", ResearchGate (2017); 21 pgs.

Girshick, R., "Fast R-CNN", Facebook AI Research (FAIR), Microsoft Research (XXXX); 64 pgs.

Litjens, G. et al., "A Survey on Deep Learning in Medical Image Analysis", arXiv:1702.05747v2 [cs.CV], (Jun. 4, 2017); 38 pgs.

Ren, S. et al., "Faster R-CNN: Towards Real-Time Object Detection with Region Proposal Networks", arXiv:1506.01497v3 [cs.CV] (Jan. 6, 2016); 14 pgs.

Ren, S. et al., "Faster R-CNN: Towards Real-Time Object Detection with Region Proposal Networks", Microsoft Research, (XXXX); 9 pgs.

Shrivastava, A. et al., "Training Region-Based Object Detectors with Online Hard Example Mining", arXiv:1604.03540v1 [cs.CV] (Apr. 12, 2016); 9 pgs.

* cited by examiner

NEGATIVE SAMPLE ENHANCED OBJECT DETECTION MACHINE

BACKGROUND

Technical Field

The present disclosure generally relates to automated image detection, and more particularly, to machine automated lesion identification.

Description of the Related Art

In recent years, deep learning algorithms have become increasingly salient for analyzing medial images. The most successful type of models for image analysis to date are convolutional neural networks (CNNs). In the context of machine learning, CNNs represent a class of deep, feed-forward artificial neural networks, which lend themselves to analyzing visual imagery, including those of medical images.

Where digital analysis of an image is performed, a computer attempts to match the characteristics of the lesion with sets of features that are indicative of various diagnoses. Typically, these features are hand-crafted, which is to say, they are manually programmed with the aid of a human expert, to identify characteristics known by the human expert to be indicative of a particular diagnosis. After the features are constructed, various medical imaging techniques can be used to characterize the lesion.

SUMMARY

According to various exemplary embodiments, a computing device, a non-transitory computer readable storage medium, and a computer implemented method of detecting abnormalities captured in a medical image are provided. A medical image is received having one or more lesions and one or more interferences. One or more convolution layers are applied to the medical image to create one or more feature maps, respectively. A region proposal network (RPN) is applied to each of the one or more feature maps to create a bounding box around each lesion and interference. For each bounding box, an object in the bounding box is classified as a lesion, an interference, or a background. Each object that is incorrectly classified as a lesion but determined to be an interference is stored as a hard-negative example to be part of a training set for a next application of the RPN.

In one embodiment, the classification is based on Faster R-CNN.

In one embodiment, a region of interest (ROI) pooling layer is applied to the one or more feature maps to combine outputs of the region proposal network into a single layer.

In one embodiment, the training is with one or more examples of lesions, one or more examples of background, and one or more examples of an interference.

In one embodiment, the one or more examples of the background are based on a random selection of regions that are determined not to include a lesion or an interference.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods of automatically identifying lesions from images. In recent years, advances in object detection were driven at least in part by region-based convolutional neural networks (R-CNNs). More recent variants, Fast R-CNN, and Faster R-CNN can achieve substantial improvement in computation speeds using very deep networks. Indeed, Faster R-CNN can achieve accurate classification in nearly real time (e.g., 10 times the speed of Fast R-CNN).

Convolutional feature maps that are used by region based detectors, such as Fast R-CNN and Faster R-CNN, can be used for generating region proposals, as discussed in more detail below. The methods and systems disclosed herein can provide a way to detect objects in images, where the detectors (e.g., object detection models) for these objects are optimized. The methods can be used in a variety of applications, including the detection of abnormalities captured in medical images. Such abnormalities may include lesions. A lesion is a region in an organ or tissue that has suffered damage through injury or disease, such as an ulcer, abscess, tumor, wound, and the like. In this regard, reference is made to FIGS. 1A to 1C, which illustrate an example endoscope image, CT/MRI image, and pathology image, respectively.

An expert may label such images for lesions. For example, in FIG. 1A, the endoscope image has regions 102 and 104 that have been identified as lesions. In FIG. 1B, region 106 has been identified as a lesion.

By way of conceptual example, if a computing device is configured to detect a feature in a picture, such as a dog, the machine can be trained with example images of dogs. The methods provided can then find the optimal detectors for a dog, which can be used to quickly identify dogs in subsequent images that are analyzed by the computing device. Accordingly, expert knowledge of the algorithm or image processing is not needed; rather, the mere indication of example objects in training pictures is typically sufficient for proper classification of the object.

Figure 2A:
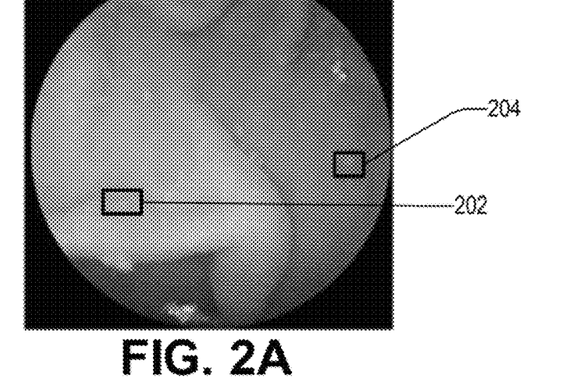
FIG. 2A illustrates a medical image that includes two lesions.

With respect to medical imaging in general, and lesion detection in particular, one challenge with prior approaches is that images of normal tissue that resembles an abnormality—but is not an actual abnormality—may still be identified as an abnormality. Stated differently, detectors are not optimal and may generate false positives and false negatives. That is because lesions may be visually unobvious due to a noisy background. In this regard, reference is made to FIG. 2A, which illustrates a medical image that includes two lesions (i.e., in regions 202 and 204). For example, these lesions have been identified to be lesions (e.g., ulcers) within the bounding box defined by (x, y, w, h), where x, and y provide the coordinates of the center of the bounding box, w provides the width, and h the height of the bounding box.

Figure 2B:
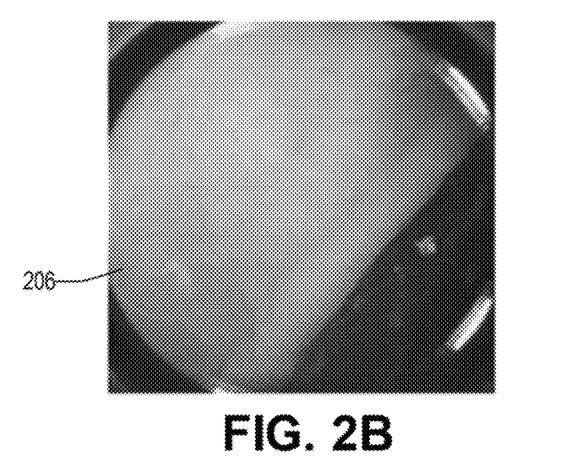
FIG. 2B illustrates an example interference.
Figure 2C:
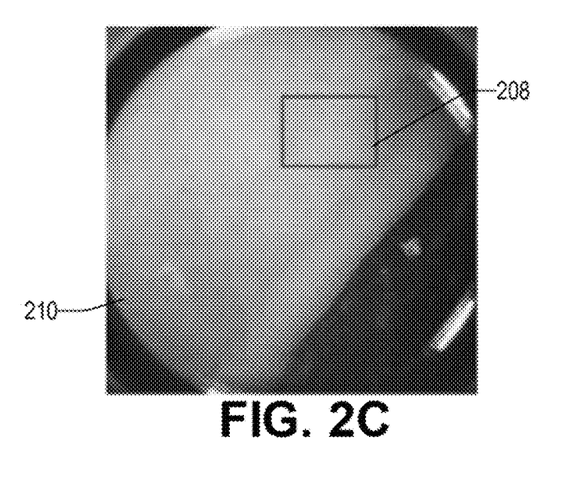
FIG. 2C illustrates examples of a lesion and a background.

By way of contrast, FIG. 2B illustrates an example interference 206. As used herein, an interference, sometimes referred to herein as a hard negative, is a feature that has the appearance of a lesion, but is ultimately determined not to be a lesion. Known systems do not include hard negatives in the training set for the detectors. Instead, examples of only actual lesions 210 and background 208 are provided, as illustrated by FIG. 2C. By virtue of the lack of bounding box labeling of hard negatives, valuable data may be wasted.

Consequently, known CNN systems typically provide a binary region proposal, namely (i) foreground (representing a potential lesion) and (ii) background. Stated differently, traditional classification models provide a 2-class model (i.e., lesion vs. background). Additional steps are then performed (e.g., additional filtration via convolution) to provide a classification. Applicants have identified that the traditional approach not only results in more false negatives, but also may involve more computational resources to determine the class of the subject object in the bounding box.

In one embodiment, the computing device is initially trained by bounding boxes of lesions that may be provided by human experts. Such training does not include hard negative examples of interferences. By running the detector discussed herein (e.g., Faster R-CNN), the computing device running the detector can generate examples of interferences (sometimes referred to herein as hard negatives or false positives). These examples of hard negatives with bounding boxes around them can then be used to train the computing device to not only identify lesions, but also interferences.

Accordingly, in one aspect, the present disclosure trains its computing device (detector) to not only identify between background and lesion, but also interferences (i.e., hard negatives). To that end, examples that were originally suspected to be lesions by a computing device, but ultimately determined to be an interference (i.e., a hard negative), are used as part of the training set of the next detection model. Training with the hard-negative examples can be used to optimize not only the RPN but also the classifier. Such approach provides an iterative training algorithm that progressively updates the detection model to improve its accuracy. By virtue of iteratively providing new hard negative examples, the detection model can be continuously improved. Further, the training data set can be progressively expanded with every iteration.

Thus, in one aspect, the classifier discussed herein operates with both positive training examples (e.g., a lesion), negative training examples (background), and examples of interferences (hard negatives). For each lesion, you create a positive training example by looking inside a bounding box. Objects that are identified by a classifier to be a lesion can be used as training examples in subsequent iterations. As to interferences, objects that were classified to be lesions but were ultimately determined to be an interference, are stored to be used as hard negative training examples for subsequent iterations. In one embodiment, wherein the determination whether an object that is an interference is incorrectly classified as an object is based on a comparison with a ground truth box. For example, if an intersection over union (IoU) overlap between the object and a ground-truth box is above a predetermined threshold, then the computing device can determine that it has incorrectly classified an interference to be a lesion (i.e., a hard-negative example).

As to negative samples (sometimes referred to herein as the background), random bounding boxes can be generated in regions that are neither lesions nor interferences. Such regions can be used as training examples for subsequent iterations.

Figure 3:
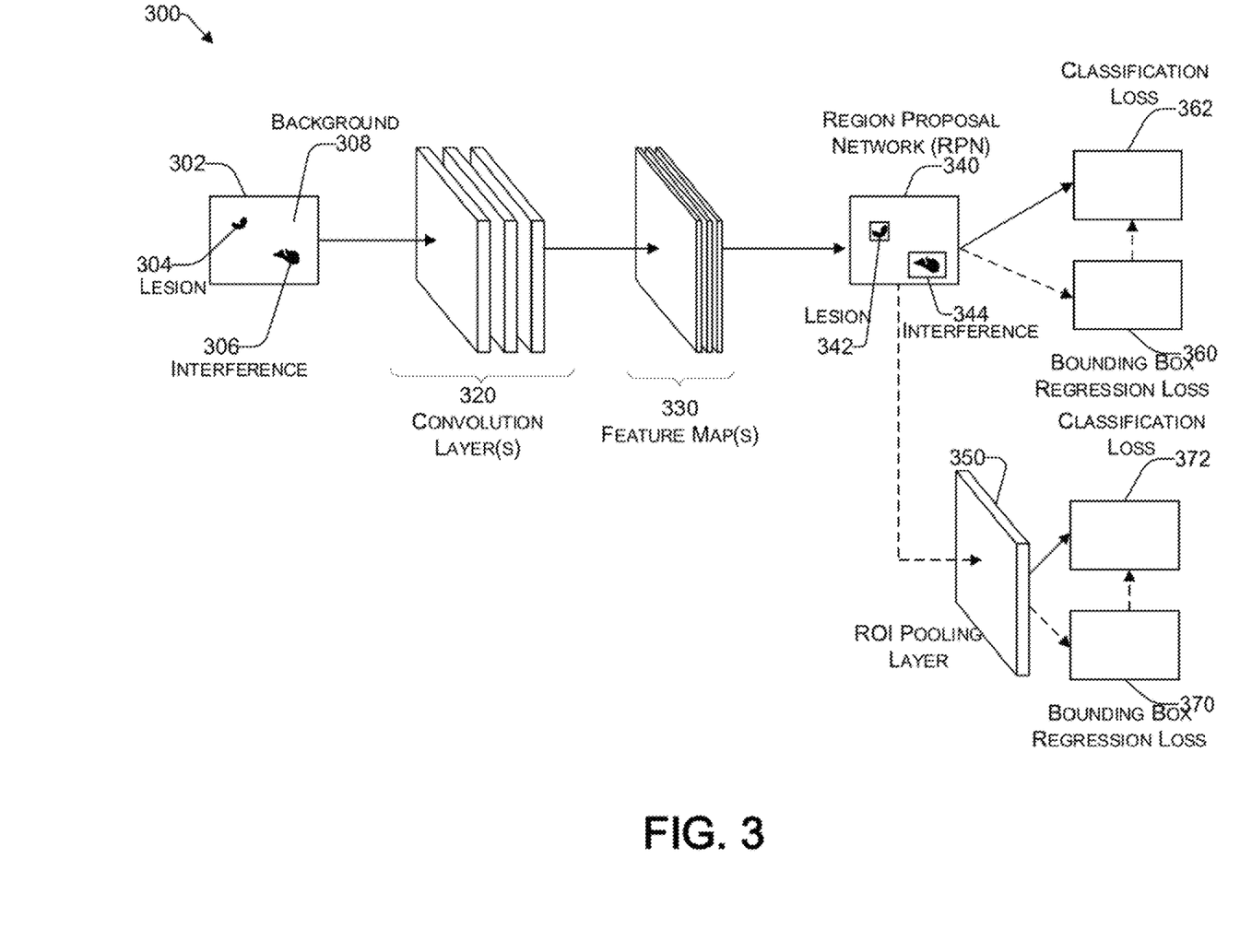
FIG. 3 is an example architecture for lesion detection, consistent with an illustrative embodiment.

FIG. 3 is an example architecture 300 for lesion detection, consistent with an illustrative embodiment. The architecture 300 can be described as having two main portions, namely, (i) a region proposal portion, comprising one or more convolution layer(s) 320, one or more feature maps 330, and a region proposal network (RPN) 340, and (ii) a region of interest (ROI) analysis portion, comprising ROI pooling layer 350, a bounding box regression loss module 360 and a classification loss module 362 that are configured to analyze the content of the proposed regions. In some embodiments, there is a region of interest (ROI) pooling layer 350 coupled between a bounding box regression loss module 370 and a classification loss module 372. Both portions of the fast R-CNN cooperate to provide a network that is configured to identify lesions, interferences, and backgrounds in a medical image.

Figure 1A:
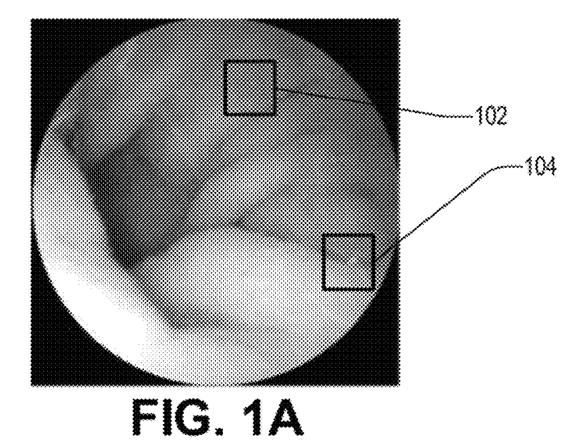
FIG. 1A illustrates an example endoscope image.
Figure 1B:
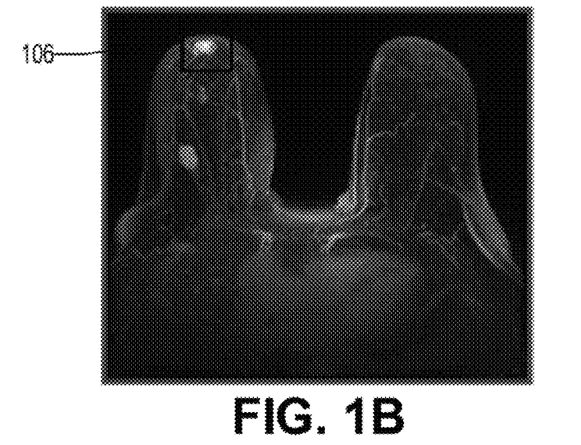
FIG. 1B illustrates an example cat-scan (CT)/magneto resistive image (MRI).
Figure 1C:
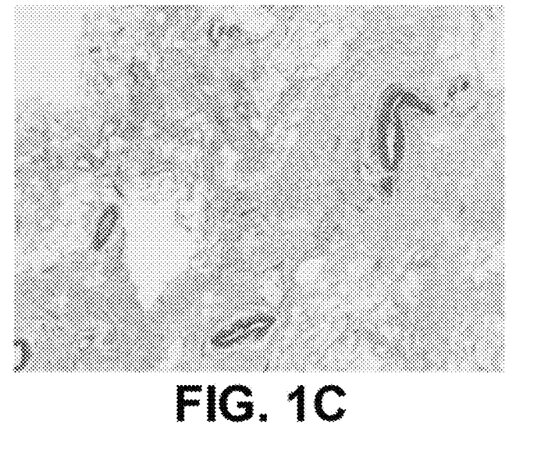
FIG. 1C illustrates an example pathology image.

The fast R-CNN uses a medical image 302 as an input, similar to those of FIGS. 1A to 1C. The image may include one or more lesions 304 and one or more interferences 306. The remaining features are part of the background 308.

A convolution network, which may comprise one or more convolution layers 320, is applied to the image 302 to produce one or more feature map(s). Each convolution layer can be interpreted as a separate filter that is configured to identify a different feature of the image, such as edges, corners, colors, curves, etc. The more number of filters the architecture 300 includes, the more image features get extracted and the better the architecture 300 becomes at recognizing patterns in images.

A feature map 330 is the output received on convolving the image 302 with a particular filter (i.e., convolution layer 320). The depth of the convolution layer(s) 320 depends on the number of filters that are used for the convolution operation, each providing a different feature map 330.

Figure 4A:
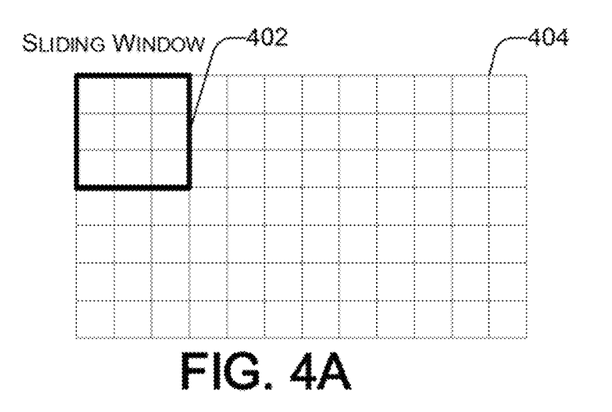
FIGS. 4A to 4C illustrate different positions of a sliding window across a feature map.
Figure 4B:
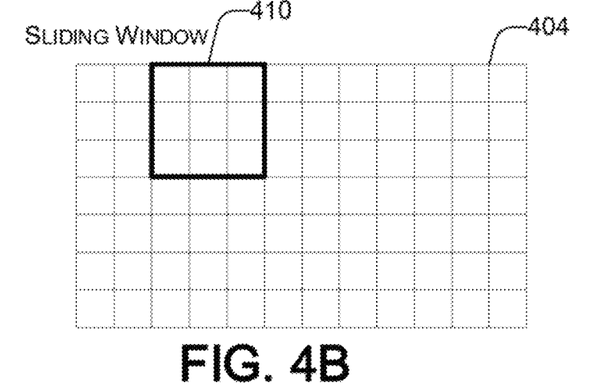
Figure 4C:
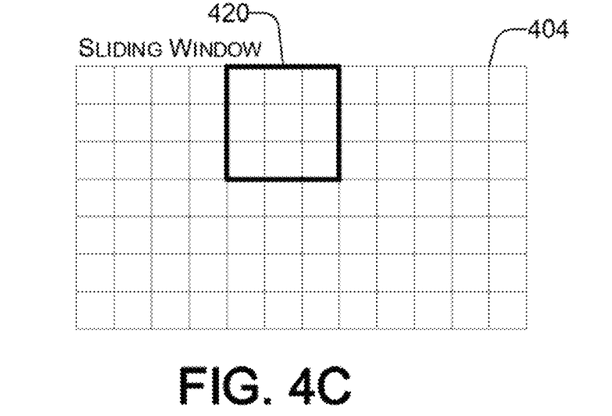

For each feature map 330, a sliding window (e.g., a filter) is run spatially across it to cover the feature map. In this regard, reference is made to FIGS. 4A to 4C, which illustrates a sliding window having size n×n that is sliding over a feature map 404. For example, the sliding window 402 may initially start in the top left corner of the feature map 404 to convolve with the content of the patch, as illustrated in FIG. 4A. The sliding window 410 then slides two positions to the right on the feature map 404, as illustrated in FIG. 4B. In various embodiments, the stride (i.e., the number of pixels being shifted each time the sliding window is moved) may be different (e.g., 1, 2, 3, etc.) Stated differently, the filter of the convolution layer, sometimes referred to as the kernel, only evaluates one patch of the feature map at a time, then moves to another patch of the feature map, and so on. In some embodiments, different sliding windows (i.e., of different size) may be used for different feature maps.

Returning to FIG. 3, the RPN 340 creates a bounding box around each identified object, thereby identifying one or more regions of interest (ROI). For example, the RPN 340 can propose a fixed set of bounding boxes without considering the feature map(s) 330. The RPN 340 creates a fixed k anchor boxes and identifies those boxes as an object (i.e., lesion or interference) or not. Thus, the RPN can create a fixed set of bounding boxes, where one or more of them may be around lesions and/or interferences. The RPN 340 uses the feature map(s) 330 to evaluate each bounding box.

Significantly, the objects identified are not limited to the foreground representing lesions (e.g., 342); rather, interferences (e.g., hard negatives such as 344 are intentionally included as well). Stated differently, unlike known RPNs, which use a binary approach in generating bounding boxes for regions of interest (i.e., foreground—representing a possible lesion), the computing device is configured to handle a three-class scenario, namely, (i) lesion, (ii) interference, and (iii) background.

During the ROI analysis portion, for each bounding box, the object therein is classified as a lesion, interference, or background by the classification loss module 362. In one embodiment, bounding boxes that were classified as a lesion, but have been identified to be an interference (i.e., a hard negative), are then used as part of the training set for subsequent RPNs, thereby iteratively improving the RPN 340 and the classifier 362. In some embodiments, for each identified lesion of the classifier, the class classification may continue to further identify a type of lesion by the classification loss module 362.

Figure 5:
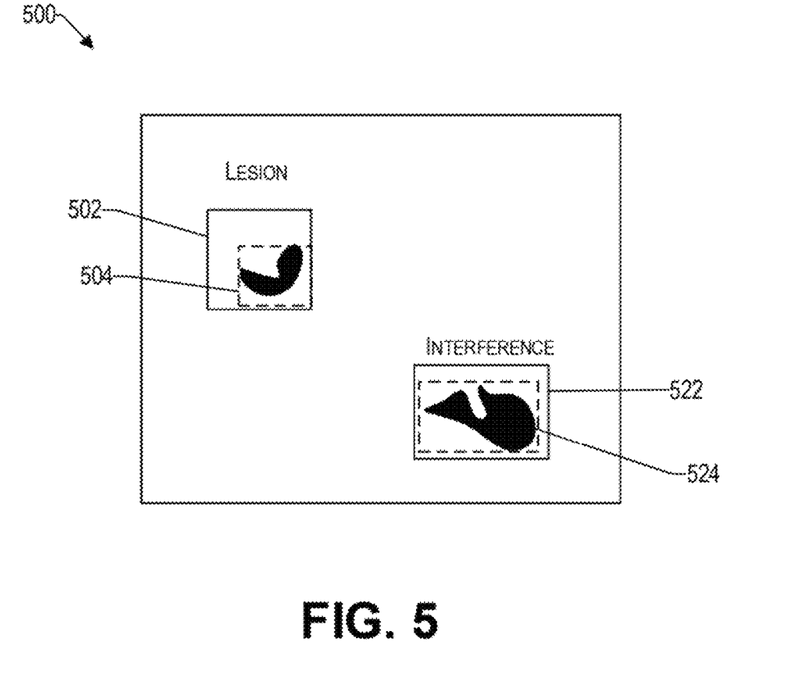
FIG. 5 illustrates a feature map having bounding boxes around a lesion and an interference.

In one embodiment, each bounding box introduced by the RPN 340 (e.g., 342, 344) is processed by a bounding box regression loss module 360, which is configured to refine the center point of the bounding box and its dimensions to better capture the object therein. In this regard, FIG. 5 illustrates a feature map 500 having bounding boxes around a lesion 502 and an interference 522, as provided by the RPN 340. The bounding box regression module 360 resizes the bounding boxes to better focus on the object captured by the bounding box. For example, a resized bounding box 504 is provided around a lesion and a resized bounding box 524 is provided around an interference identified from the feature map 500.

Returning to FIG. 3, the classification loss module 362 indicates how training penalizes the deviation between the predicted and actual classification labels. In various embodiments, Sigmoid cross-entropy loss may be used for predicting K independent probability values in [0,1], and SoftMax function (sometimes referred to a normalized exponential function) may be used for predicting a single class of K mutually exclusive classes.

In one embodiment, there is a region of interest (ROI) pooling layer 350 that is configured to combine the outputs of the RPN 340 into a single layer, thereby reducing the volume of data. In various embodiments, max pooling, average pooling, or minimum pooling can be used. For example, max pooling uses the maximum value from each of a cluster of neurons at the prior layer. Another example is average pooling, which uses the average value from each of a cluster of neurons at the prior layer. The output is then provided to the classification loss module 362 to continue the classification. In one embodiment, since Fast R-CNN uses fully connected layers, ROI pooling layer 350 can be used to warp the variable size bounding boxes into a predefined size shape. By virtue of using the ROI pooling layer 350, the spatial dimension of the data is reduced, thereby reducing the volume of data being processed and increasing computational performance.

Example Processes

Figure 6:
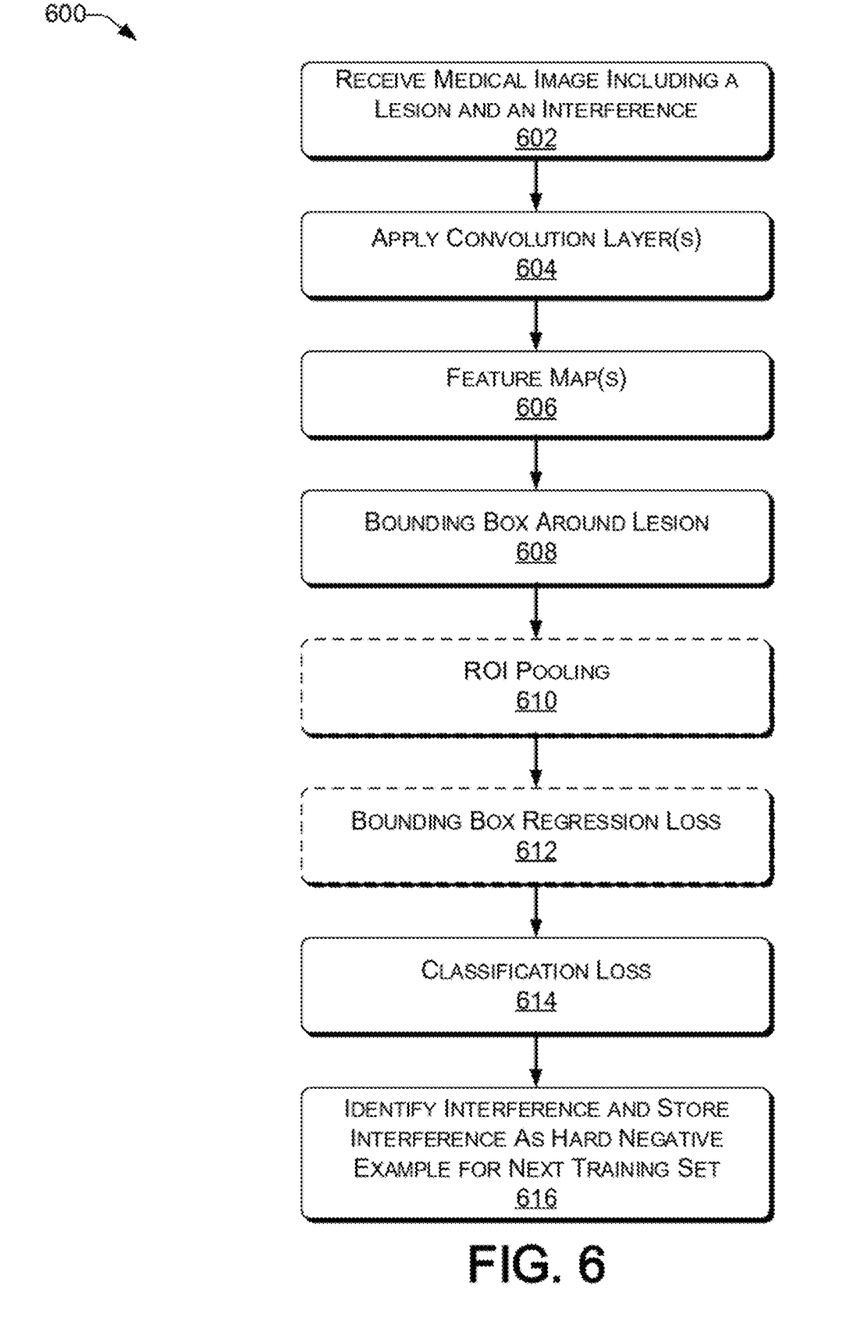
FIG. 6 is a process for classification of lesions during an initial phase, consistent with an illustrative embodiment.
Figure 7:
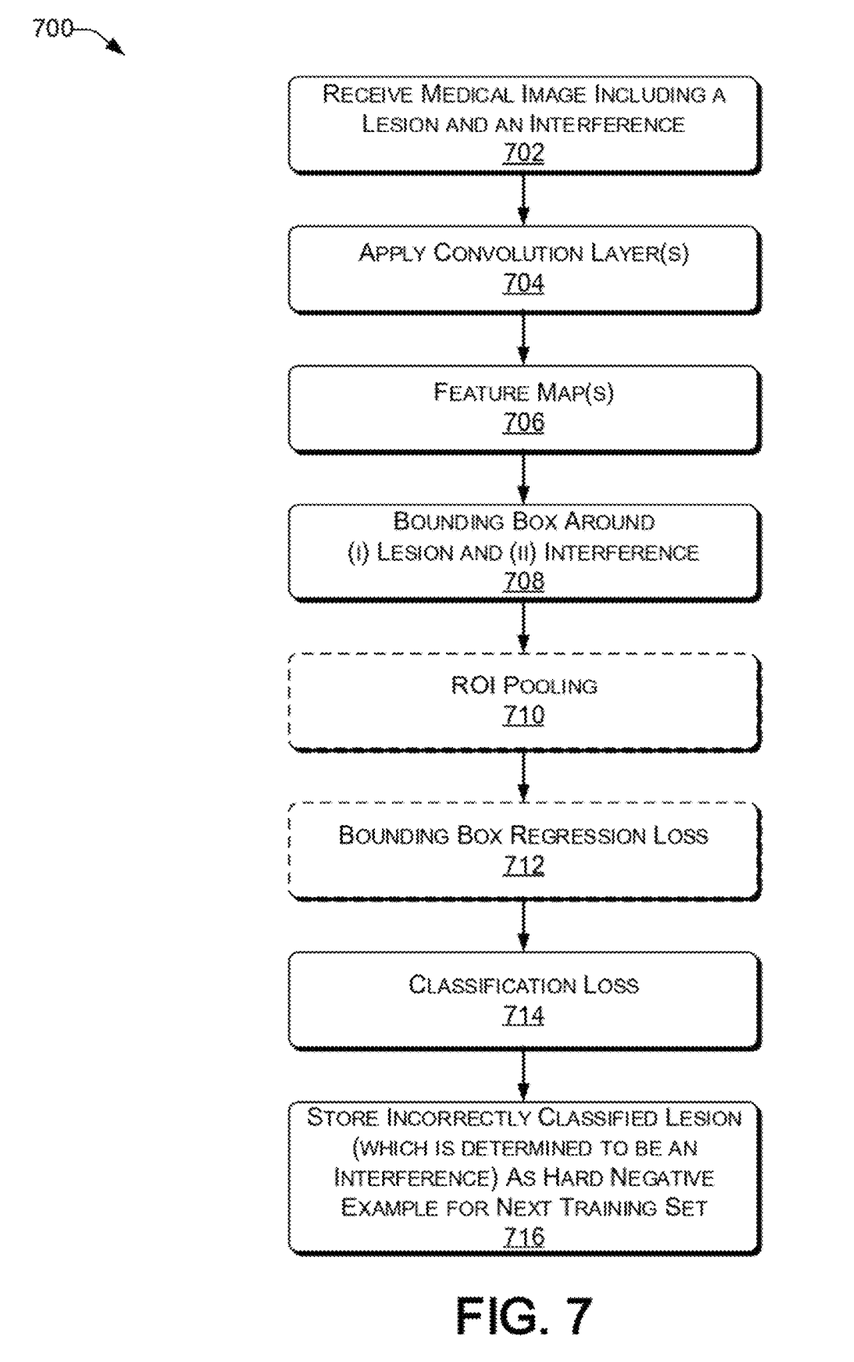
FIG. 7 is a process for classification of lesions and interferences during an initial phase, consistent with an illustrative embodiment.

With the foregoing overview of the architecture 300, it may be helpful now to consider a high-level discussion of an example process. To that end, FIGS. 6 and 7 present processes 600 and 700 for classification of lesions, consistent with a illustrative embodiments. More particularly, process 600 relates to an initial training and process 700 relates to an enhanced training of a model.

Processes 600 and 700 are each illustrated as a collection of blocks in a process, representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes 600 and 700 are described with reference to the architecture 300 of FIG. 3.

At block 602, the computing device receives a medical image to be classified. The medical image may include one or more lesions and one or more interferences.

At block 604, one or more convolution layers 320 are applied to the medical image.

At block 606, one or more feature maps are created. Each convolution layer can be viewed as a filter that is configured to identify a different feature of the medical image.

At block 608, the computing device applies a region proposal network 340 to each of the one or more feature maps generated by the convolution layer(s) to create a bounding box around each region of interest. More particularly, a bounding box is created around lesion(s) of the medical image, as identified by the convolution layer(s). For example, the RPN may create a predetermined number of bounding boxes in different regions of the medical image. The RPN can then use the feature map(s) 330 to identify bounding boxes that include lesions and/or interferences.

In one embodiment, at block 610, a region of interest (ROI) pooling layer is applied to reduce the dimensionality of each feature map 330. In various embodiments the ROI pooling layer may determine a maximum, average, sum, etc., of each window. For example, for max pooling, a spatial neighborhood (e.g., a 3×3 pixel window) may be used to take the largest element from the feature map 330.

In one embodiment, at block 612, each bounding box introduced by the RPN 340 (e.g., 342, 344) that includes an object (i.e., lesion or interference) is processed by a bounding box regression loss module 360, which refines the respective bounding box and its dimensions to better capture the object therein, as discussed previously.

At block 614, the computing device classifies the object in the bounding box as a lesion or a background. To that end, the computing device may be aided by a loss function, discussed in more detail in the context of FIG. 7 below.

At this stage, there are four cases that can be provided by the classifier. By demonstrative example, the four case options are: (i) classify a lesion as a lesion (correct); (ii) classify a lesion as background (false); (iii) classify a background (including an interference) as a lesion (false positive); and (iv) classify a background as a background (correct).

At block 616, each object that is incorrectly classified as a lesion but is determined to be an interference (false positive above) is stored as a hard-negative example for future training.

Reference now is made to FIG. 7, which may follow process 600 of FIG. 6. Process 700 represents a steady state iterative phase after the initial phase of process 600.

At block 702, the computing device receives a medical image to be classified. The medical image may include one or more lesions and one or more interferences.

At block 704, one or more convolution layers 320 are applied to the medical image.

At block 706, one or more feature maps are created. Each convolution layer can be viewed as a filter that is configured to identify a different feature of the medical image.

At block 708, the computing device applies a region proposal network 340 to each of the one or more feature maps generated by the convolution layer(s) to create a bounding box around each region of interest. More particularly, a bounding box is identified around lesion(s) and interference(s) of the medical image, as identified by the convolution layer(s).

In one embodiment, at block 710, a region of interest (ROI) pooling layer is applied to reduce the dimensionality of each feature map 330. In various embodiments the ROI pooling layer may determine a maximum, average, sum, etc., of each window. For example, for max pooling, a spatial neighborhood (e.g., a 3×3 pixel window) may be used to take the largest element from the feature map 330.

In one embodiment, at block 712, each bounding box that is identified by the RPN 340 to include an object (e.g., 342, 344) is processed by a bounding box regression loss module 360, which refines the respective bounding box and its dimensions to better capture the object therein, as discussed previously.

At block 714, the computing device classifies the object in the bounding box as a lesion, an interference, or a background. Thus, unlike prior art systems that only provide a 2-way classification (i.e., foreground or background), the classification herein is 3-way (i.e., lesion, interference, and background.)

To that end, the computing device may be aided by a loss function, which is used to guide the training process of a neural network. In various embodiments, L1 loss, mean squared error (L2 loss), cross entropy loss, focal loss, average binary cross entropy loss, or any combination thereof may be used. In this way, the computing device is able to determine whether the bounding box includes a lesion, an interference, or simply a background.

At this stage, there are nine possible outputs of the classifier: (i) classify a lesion as a lesion (correct); (ii) classify a lesion as background (incorrect); (iii) classify a lesion as an interference (incorrect); (iv) classify a background as a lesion (new false positive—can be collected as an interference in the next training); (v) classify a background as a background (correct); (vi) classify a background as an interference (somewhat correct—but not of concern since the focus is lesion); (vii) classify an interference as a lesion (false positive—can be collected as interference for the next training); (viii) classify an interference as an interference (correct—can be collected as interference for the next training); and (ix) classify an interference as a background (somewhat correct—not included for the next training.)

At block 716, each object that is incorrectly classified as a lesion but determined to be an interference is stored as a hard-negative example for future training of the RPN and/or classifier. In one embodiment, each object that is incorrectly classified as a lesion but is a background is also stored as a hard-negative example for future training of the RPN and/or classifier.

Example Computer Platform

Figure 8:
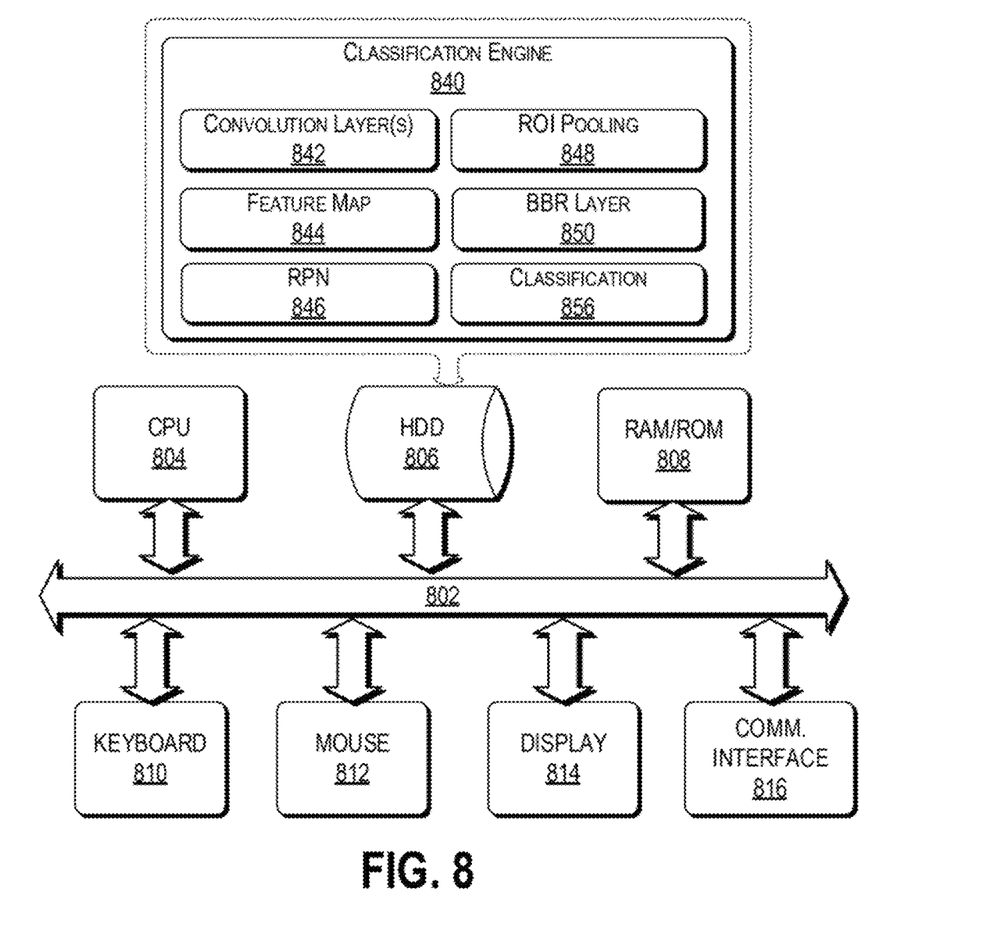
FIG. 8 is a functional block diagram illustration of a computer hardware that can communicate with various networked components.

As discussed above, functions relating to the identification of lesions, interferences, and background, can be performed with the use of one or more computing devices connected for data communication via wireless or wired communication, as shown in FIG. 3. Reference now is made to FIG. 8, which is a functional block diagram illustration of a computer hardware platform that can be used to perform various functions described herein.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as the classification engine 840, in a manner described herein. The classification engine 840 may have various modules configured to perform different functions.

For example, there may be convolution layer module 842 that is operative to apply one or more convolution layers (e.g., filters or kernels) to a medical image to extract features therefrom.

In one embodiment, there is a feature map module 844 operative to create one or more feature maps based on the convolution layers applied to the medical image.

In one embodiment, there is a region proposal network (RPN) module 846 that is operative to create a bounding box around each region of interest.

In one embodiment, there is a region of interest (ROI) pooling module 848 that is operative to reduce the dimensionality of each feature map provided by the feature map module 844.

In one embodiment, there is a bounding box regression (BBR) layer module 850 that is operative to refine a center point and dimensions of each bounding box to better capture the object therein.

In one embodiment, there is a classification module 856 that is operative to classify an object in a bounding box a lesion, an interference, or background. In some embodiments, the classification module 856 may further determine a type of lesion.

In one embodiment, a program, such as Apache™, can be stored for operating the system as a Web server. In one embodiment, the HDD 806 can store an executing application that includes one or more library software modules, such as those for the Java™ Runtime Environment program for realizing a JVM (Java™ virtual machine).

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, implement the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the call flow and/or block diagram block or blocks.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device for content and programming coupled to the processor;
   a classification engine stored in the storage device, wherein an execution of the classification engine by the processor configures the user device to perform acts comprising:
   receiving a medical image having one or more lesions and one or more interferences;
   applying one or more convolution layers to the medical image to create one or more feature maps, respectively;
   applying a region proposal network (RPN) to each of the one or more feature maps to create a bounding box around each lesion and interference;
   for each bounding box, classifying an object in the bounding box as a lesion, an interference, or a background; and
   storing each object that is incorrectly classified as a lesion but determined to be an interference, as a hard-negative example to be part of a training set for a subsequent application of the RPN.

2. The computing device of claim 1, wherein the classification engine is based on Faster R-CNN.

3. The computing device of claim 1, wherein execution of the classification engine further configures the computing device to perform an act comprising, applying a region of interest (ROI) pooling layer to the one or more feature maps to combine outputs of the region proposal network into a single layer.

4. The computing device of claim 3, wherein the ROI pooling layer uses maximum pooling.

5. The computing device of claim 1, wherein the computing device is trained with one or more examples of lesions, one or more examples of background, and one or more examples of an interference.

6. The computing device of claim 1, wherein the one or more examples of the background are based on a random selection of regions that are determined not to include a lesion or an interference.

7. The computing device of claim 1, wherein execution of the classification engine further configures the computing device to perform acts comprising, for each bounding box, applying a bounding box regression loss to refine a center point and dimensions of the bounding box to better capture an object therein.

8. The computing device of claim 1, wherein execution of the classification engine further configures the computing device to perform acts comprising, storing each object that is incorrectly classified as a lesion but determined to be a background, as a hard-negative example to be part of a training set for a subsequent application of the RPN.

9. The computing device of claim 1, wherein the determination that an object that is an interference is incorrectly classified as an object is based on an intersection over union (IoU) overlap between the object and a ground-truth box being above a predetermined threshold.

10. A non-transitory computer readable storage medium tangibly embodying a computer readable program code having computer readable instructions that, when executed, causes a computing device to carry out a method of detecting abnormalities captured in a medical image, the method comprising:
    receiving a medical image having one or more lesions and one or more interferences;
    applying one or more convolution layers to the medical image to create one or more feature maps, respectively;

applying a region proposal network (RPN) to each of the one or more feature maps to create a bounding box around each lesion and interference;

for each bounding box, classifying an object in the bounding box as a lesion, an interference, or a background; and storing each object that is incorrectly classified as a lesion but determined to be an interference, as a hard-negative example to be part of a training set for a subsequent application of the RPN.

11. The non-transitory computer readable storage medium of claim 10, wherein the classification is based on Faster R-CNN.

12. The non-transitory computer readable storage medium of claim 10, further comprising, applying a region of interest (ROI) pooling layer to the one or more feature maps to combine outputs of the region proposal network into a single layer.

13. The non-transitory computer readable storage medium of claim 10, wherein the computer readable program code is trained with one or more examples of lesions, one or more examples of background, and one or more examples of an interference.

14. The non-transitory computer readable storage medium of claim 10, wherein the one or more examples of the background are based on a random selection of regions that are determined not to include a lesion or an interference.

15. The non-transitory computer readable storage medium of claim 10, further comprising, for each bounding box, applying a bounding box regression loss to refine a center point and dimensions of the bounding box to better capture an object therein.

16. A computer implemented method, comprising:

receiving a medical image having one or more lesions and one or more interferences;

applying one or more convolution layers to the medical image to create one or more feature maps, respectively;

applying a region proposal network (RPN) to each of the one or more feature maps to create a bounding box around each lesion and interference;

for each bounding box, classifying an object in the bounding box as a lesion, an interference, or a background; and storing each object that is incorrectly classified as a lesion but determined to be an interference, as a hard-negative example to be part of a training set for a subsequent application of the RPN.

17. The computer implemented method of claim 16, further comprising, applying a region of interest (ROI) pooling layer to the one or more feature maps to combine outputs of the region proposal network into a single layer.

18. The computer implemented method of claim 16, wherein the computer implemented method is trained with one or more examples of lesions, one or more examples of background, and one or more examples of an interference.

19. The computer implemented method of claim 16, wherein the one or more examples of the background are based on a random selection of regions that are determined not to include a lesion or an interference.

20. The computer implemented method of claim 16, further comprising, for each bounding box, applying a bounding box regression loss to refine a center point and dimensions of the bounding box to better capture an object therein.

* * * * *